United States Patent
Dzung et al.

(10) Patent No.: US 7,865,331 B2
(45) Date of Patent: Jan. 4, 2011

(54) ESTIMATING A TIME OFFSET BETWEEN STATIONARY CLOCKS

(75) Inventors: Dacfey Dzung, Wettingen (CH); Mats Larsson, Baden-Daettwil (CH)

(73) Assignee: ABB Research Ltd, Zurich (CH)

( * ) Notice: Subject to any disclaimer, the term of this patent is extended or adjusted under 35 U.S.C. 154(b) by 0 days.

(21) Appl. No.: 12/698,641

(22) Filed: Feb. 2, 2010

(65) Prior Publication Data
US 2010/0138187 A1 Jun. 3, 2010

Related U.S. Application Data

(63) Continuation of application No. PCT/EP2008/057931, filed on Jun. 23, 2008.

(30) Foreign Application Priority Data

Aug. 6, 2007 (EP) .................................. 07113845

(51) Int. Cl.
*G04G 5/00* (2006.01)
*H04B 1/06* (2006.01)
(52) U.S. Cl. ...................................... 702/176; 455/231
(58) Field of Classification Search ................ 702/176; 342/357.06; 455/231
See application file for complete search history.

(56) References Cited

U.S. PATENT DOCUMENTS

| | | | |
|---|---|---|---|
| 6,295,455 B1 * | 9/2001 | Fischer et al. | 455/456.2 |
| 6,788,249 B1 * | 9/2004 | Farmer et al. | 342/357.12 |
| 7,142,154 B2 * | 11/2006 | Quilter et al. | 342/357.06 |
| 2004/0073387 A1 | 4/2004 | Larsson et al. | |

FOREIGN PATENT DOCUMENTS

EP 1408595 A1 4/2004

OTHER PUBLICATIONS

International Search Report (PCT/ISA/210) for PCT/EP2008/057931 mailed Nov. 19, 2008.

(Continued)

*Primary Examiner*—Bryan Bui
(74) *Attorney, Agent, or Firm*—Buchanan Ingersoll & Rooney PC

(57) ABSTRACT

Time synchronization of two clocks is disclosed herein, such as two stationary clocks. A global time signal from a global time reference or common time source can be used to calculate a common view based clock offset between the two clocks. In parallel, a network based clock offset between the two clocks can be calculated based on messages exchanged over a communication network interconnecting the two clocks, without reverting to the global time reference. Two recent values (e.g., the two most recent values) of the common view clock offset and the network based clock offset can be combined or superposed in a seamless way to produce a final time offset estimate. The combination of independently calculated common view and network based clock offsets can be a weighted average of the two values, involving respective weights based on quality estimates of the latter. The time synchronization schemes based on a Global Positioning System (GPS) and a wide area communication network can be combined to synchronize the stationary clocks of phasor measurement units (PMUs) of a wide area monitoring system to a central server clock at a Network Control Center (NCC) of the system.

9 Claims, 1 Drawing Sheet

OTHER PUBLICATIONS

European Search Report for EP 07113845.7 dated Feb. 4, 2008.
A. Carta et al., "A Flexible GPS-based System for Synchronized Phasor Measurement in Electric Distribution Networks", Instrumentation and Measurement Technology Conference 2006, Sorrento, Italy, Apr. 24-27, 2006, Proceedings of the 23rd IEEE, IEEE, 2006, pp. 1547-1552 (XP-031017138).

Notification Concerning Transmittal of International Preliminary Report on Patentability (Forms PCT/IB/326 and PCT/IB/373) and the Written Opinion of the International Searching Authority (Form PCT/ISA/237) issued in corresponding International Application No. PCT/EP2008/057931 dated Feb. 18, 2010.

* cited by examiner

ESTIMATING A TIME OFFSET BETWEEN STATIONARY CLOCKS

RELATED APPLICATIONS

This application claims priority as a continuation application under 35 U.S.C. §120 to PCT/EP2008/057931, which was filed as an International Application on Jun. 23, 2008 designating the U.S., and which claims priority to European Application 07113845.7 filed in Europe on Aug. 6, 2007. The entire contents of these applications are hereby incorporated by reference in their entireties.

FIELD

The disclosure relates to the field of time synchronization between two geographically separated clocks, such as the stationary clocks of the phasor measurement units of a wide area monitoring system for a power transmission network.

BACKGROUND INFORMATION

For the wide area monitoring of power transmission networks, phasor measurement units (PMUs) are installed at distributed locations. The PMUs perform sampling of current and voltage waveforms, calculate phasor values from the sampled waveforms, and cyclically send the phasor values to a Network Control Center (NCC) over a wide area communication network. The NCC monitors the status of the power transmission network by comparing synchronous phasor measurements received from the distributed locations. Hence synchronicity of phasor measurements is important and involves the sampling clocks of the PMUs being synchronized. To make the system robust against transmission delays and jitter over the communication network, phasor messages transmitted by the PMUs include a timestamp indicating the precise measurement time. Likewise, routers and switches in wide area communication networks can involve a similar degree of time synchronization.

The wide area synchronization of the distributed PMU clocks is today done using commercial Global Positioning System (GPS) time receivers. However, it is known that propagation and interference problems may degrade or even prevent GPS reception. The surrounding landscape may shadow a particular location from a GPS satellite, or solar wind may affect the reception of GPS signals for some minutes. While navigating vehicles may readily switch to other systems for determining their position, no such alternatives have been implemented today for the time synchronization of stationary clocks.

SUMMARY

A method is disclosed of estimating a time offset between first and second clocks which receive a global time signal and which are interconnected through a communication network, comprising: receiving a broadcast global time signal from a global time reference for calculating, at the first clock, a common view based clock offset between the first and second clocks based on reception times of the global time signal at each of the first and second clocks; exchanging time-critical messages between the first and second clocks; calculating, at the first clock, a network based clock offset between the first and second clocks based on transmission times and reception times of the messages; and combining the common view based clock offset and the network based clock offset to estimate the time offset.

A device is also disclosed comprising: means for receiving a global time signal at a location of a first clock; and means for calculating a common view based clock offset between the first clock and a second clock based on reception times of the global time signal at each of the first clock and the second clock, and for calculating a network based clock offset between the first clock and the second clock based on transmission times and reception times of time-critical messages exchanged between the first clock and the second clock, wherein the calculating means combines the common view based clock offset and the network based clock offset to estimate a time offset between the first clock and the second clock.

BRIEF DESCRIPTION OF THE DRAWINGS

The subject matter of the disclosure will be explained in more detail in the following text with reference to exemplary embodiments which are illustrated in the attached drawings, in which.

The reference symbols used in the drawings, and their meanings; are listed in summary from in the list of reference symbols. In principle, identical parts are provided with the same reference symbols in the figures.

DETAILED DESCRIPTION

Exemplary embodiments are directed to time synchronization of two clocks, such as two (or more) stationary clocks.

According to the exemplary embodiments, a global time signal from a global time reference or time source in common view can be used to calculate a common view based clock offset between two stationary clocks instead of two respective clock offsets between each one of the clocks and the global time reference. In parallel, a network based clock offset between the two clocks can be calculated based on messages exchanged over a communication network interconnecting the two clocks and without reverting to the global time reference. For example, the two most recent values of the common view and network based clock offsets can then be combined or superposed in a seamless or hitless way to produce a final time offset estimate.

In an exemplary variant of the disclosure, the combination of the independently calculated common view and network based clock offsets is a weighted average of the two values, involving respective weights based on quality estimates of the latter. In an exemplary embodiment of the disclosure, the calculation of the common view based clock offset and the network based clock offset are updated independently of each other and repeated as frequently as suitable.

In order to combine the time synchronization schemes based on the Global Positioning System (GPS) and the communication network for the stationary clocks of the Phasor Measurement Units (PMUs) of a wide area monitoring system in an optimum manner, the PMU client clocks can, for example, be synchronized to a central server clock at the Network Control Center (NCC) of the system, rather than to the GPS clock itself. In practice, as GPS one-way time distribution—if available and operating—can have higher accuracy than network-based synchronization, the method of the disclosure can serve as a dynamic back-up using the network whenever the GPS-synchronization fails. While GPS is available, it can improve the accuracy of the network-based synchronization, for example, by correcting for transmission jitter and delay asymmetries in the network-based synchronization scheme.

Figure 1:
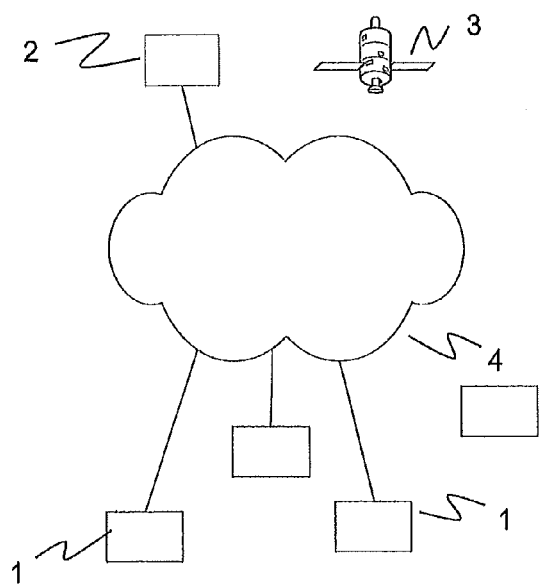
FIG. 1 schematically shows an exemplary wide area monitoring system.
Figure 2:
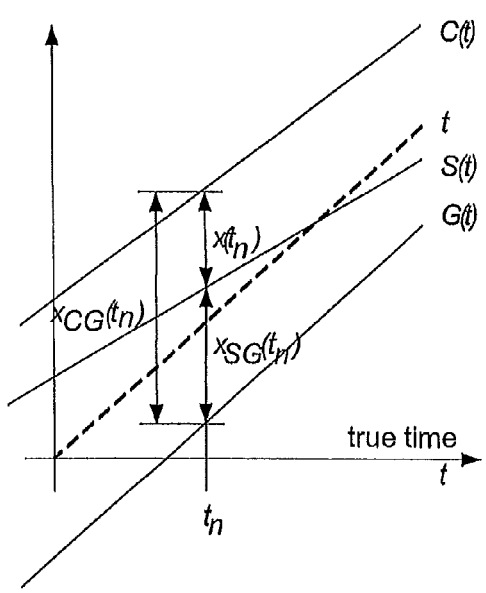
FIG. 2 depicts exemplary clock relationships.

FIG. 1 shows an exemplary wide area monitoring system for a power transmission network, with several phasor measurement units (PMUs) installed at distributed locations. The PMU calculates phasor values and cyclically sends these to a Network Control Center (NCC) over a wide area communication network. A satellite of a Global Positioning System (GPS) broadcasts global time signals. Any clock at one of the PMUs (e.g., the client or slave clock C) can be synchronized with the clock at the NCC (e.g., the server or master clock S). FIG. 2 depicts the exemplary clock relationships. The clock of a PMU C(t) is characterized by:

$$C(t)=\phi_C \cdot t + \theta_C \quad (1)$$

where $\theta_c$ is the time offset, $\phi_C \cdot t$ is the clock drift, and t denotes true time. Similarly, for the clock S(t) of the NCC:

$$S(t)=\phi_S \cdot t + \theta_S \quad (2)$$

The clocks C(t) of the PMUs should be synchronized, in an exemplary embodiment, to the clock S(t) of the NCC (e.g., the time offset x(t) of the PMU clock against the NCC clock should be estimated and then corrected at the client), where:

$$x(t) \stackrel{def}{=} C(t) - S(t) = \underbrace{(\phi_C - \phi_S)t}_{y(t)} + (\theta_C - \theta_S) \quad (3)$$

Here, the term y(t) denotes a frequency offset. Practical methods to obtain this offset are:

1. One-way GPS measurements: Both the clients and the server receive time information G(t) broadcast from a common source, in practice from a GPS satellite. The receive times measured by the client and the server are C'(t) and S'(t), respectively, for which:

$$C'(t)=G(t)+x_{CG}(t)+d_{GC} \quad (4)$$

$$S'(t)=G(t)+x_{SG}(t)+d_{GS} \quad (5)$$

hold. In (4), $x_{CG}$ is the offset between client and GPS clocks, and $d_{GC}$ is the propagation delay between the GPS satellite and the client. Similar definitions are used in (5). With known relative positions of clocks and satellites, the delays can be compensated, to give the corrected clocks:

$$C(t)=C'(t)-d_{GC} \quad (6)$$

$$S(t)=S'(t)-d_{GS} \quad (7)$$

By comparison of the values C(t) and G(t), it is then straightforward to obtain:

$$x_{CG}(t)=C(t)-G(t) \text{ and } x_{SG}(t)=S(t)-G(t).$$

This is a known way of synchronising PMU clocks. The signal xCG(t) controls the local PMU oscillator which generates 1 pps (one pulse per second) and (e.g.,10 MHz) clock signals, to synchronize PMU sampling and time stamping.

2. Common-view GPS measurements: In many applications it is not necessary or not desired to estimate $x_{CG}(t)$ and $x_{SG}(t)$ individually, but it may be sufficient to obtain the clock offset x(t) between client and server. This can be achieved by making use of the fact that the GPS broadcast signal G(t) is in their common view. For agreed GPS broadcast times $G(t_i)$, the client and server record the reception times $C(t_i)$ and $S(t_i)$, and exchange these measurements in a non time critical manner over some communication network. The difference of these measurements is:

$$C(t_i)-S(t_i)=x_{CG}(t_i)-x_{SG}(t_i)=x_G(t_i) \quad (8)$$

using (4) to (7) and FIG. 2. Here, $xG(t_i)$ denotes the offset x(t) of C(t) with respect to S(t), as determined by cancelling-out the common GPS measurement $G(t_i)$. Kalman filtering or other averaging techniques can be used to further improve the estimation of x(t). This common-view method is a known method to compare atomic clocks for the definition of the Coordinated Universal Time (UTC).

3. Two-way measurements: Clock client and server perform and exchange time measurements in real-time over a (e.g., time critical) communication network, to directly determine the clock offset of the client. Standard two-way time synchronisation protocols are SNTP on the Internet, and IEEE 1588 for devices connected to a LAN. Important steps are as follows, using IEEE 1588 terminology:

(i) At time $t_n$, the server broadcasts a Sync message with timestamp $S_1(t_n)$, which is received by the client at $C_1(t_n)$. Taking into account the message transmission delay $d_{SC}(t)$ of the Sync message from the server to the client, the following holds:

$$C_1(t_n)=S_1(t_n)+x(t_n)+d_{SC}(t_n) \quad (9)$$

where x(t) is the offset, to be determined by the two-way method.

(ii) At client time $C_2(t_n)$, the client sends a Delay_Request message to the server, which is received by the server at time $S_2(t_n)$. The server responds with a Delay_Response message which contains the value of $S_2(t_n)$. Similarly to above, with $d_{CS}(t)$ denoting the propagation delay of the Delay_Request in the reverse direction from client to server:

$$S_2(t_n)=C_2(t_n)-x(t_n)+d_{CS}(t_n) \quad (10)$$

(iii) The 4 measurements $S_1(t_n)$, $C_1(t_n)$, $C_2(t_n)$, and $S_2(t_n)$ are now available at the client. Assuming that the transmission delays are equal (e.g., $d_{SC}(t)=d_{CS}(t)=d(t)$), the client can solve (9) and (10) for $x(t_n)$, as the desired estimate of the clock offset:

$$d(t_n) = \frac{(C_1(t_n)-S_1(t_n))+(S_2(t_n)-C_2(t_n))}{2} \quad (11)$$

$$x_T(t_n) = (C_1(t_n)-S_1(t_n))-d(t_n) = \frac{(C_1(t_n)-S_1(t_n))-(S_2(t_n)-C_2(t_n))}{2} \quad (12)$$

where $x_T(t_n)$ denotes the estimate of the true offset x(t), as obtained by the two-way measurement method at time tn. Methods such as Kalman filtering and averaging can further improve the estimation accuracy of time- and frequency offsets (x and y), given a sequence of measurements performed at times $t_n$, $t_n+1$, $t_n+2$, etc.

This two-way method for time synchronisation relies on the communication network between the clients and server. The communication can be time critical in the sense that any stochastic variation and asymmetries in the delays $d_{SC}(t)$ and $d_{CS}(t)$ can affect the synchronisation accuracy.

The detailed steps of an exemplary procedure are described in the following for a specific PMU client clock node C with clock C(t). All PMUs perform the procedure in parallel to synchronize their individual clocks to the central server clock S(t) of the server S. S is located at the NCC.

Figure 3:
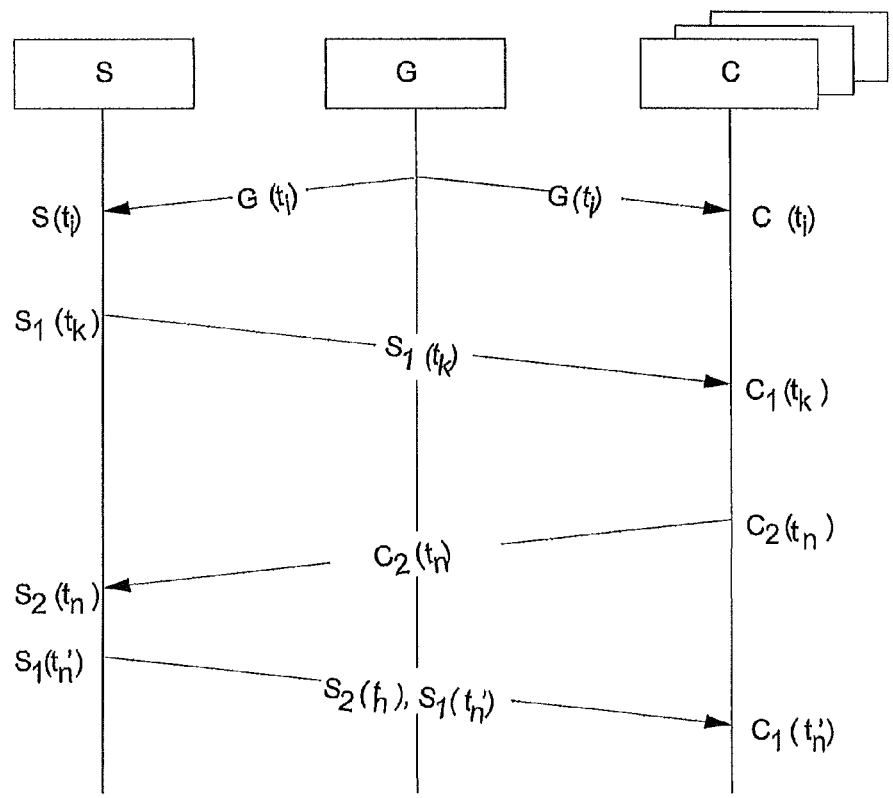
FIG. 3 shows an exemplary message sequence chart.

FIG. 3 shows an exemplary message sequence chart of one round of the proposed procedure. The FIG. 3 chart illustrates a device which includes means, represented as communication paths, for receiving global time signal at locations of a first clock (c), and means, represented as a PMU labelled "C", for calculating a common view based clock offset between the first clock and a second clock based on reception times of the global time signal at each of the first clock and the second clock, and for calculating a network based clock offset between the first clock and the second clock based on transmission times and reception times of time-critical messages exchanged between the first clock and the second clock, wherein the calculating means combines the common view based clock offset and the network based clock offset to estimate a time offset between the first clock and the second clock. In FIG. 3:

1. The server clock S(t) is initially free-running (uncontrolled oscillator).
2. The client clock C(t) is initially free-running.
3. If GPS one-way time reception is available at the server S, it receives at time ti the GPS time $G(t_i)$, and records its reception time $S(t_i)$. It may use the GPS time to control its oscillator.
4. The server S broadcasts a Sync message to all clients Cs, cyclically at times $t_k$. The message contains
   timestamp of message transmission $S_1(t_k)$,
   if available from 3, reception time of the GPS time message $S(t_i)$.
5. C receives the Sync message and also records the message reception time $C_1(t_k)$.
6. If GPS one-way time reception is available at the client C, it receives at time $t_i$ the GPS time $G(t_i)$, and records its reception time $C(t_i)$. If available from 4, C calculates its clock offset against S, according to the common-view method:

$x_G(t_i)=C(t_i)-S(t_i)$

C should use successive measurements or other system information (e.g., from the GPS data on satellite health and clock quality) to determine the quality of the clock offset estimate $x_G(t_i)$, expressed (e.g., by the variance $\sigma_G^2$).
7. C sends a Delay_Request message to S. The message contains
   timestamp of message transmission $C_2(t_n)$.
   and can be combined with a cyclic PMU phasor data message in order to reduce the number of messages and the message overheads on the communication network.
8. S receives the Delay_Request message and records the message reception time $S_2(t_n)$, and responds with a Delay_Response message to C (at time $t_n'$). The message contains
   the value of $S_2(t_n)$,
   optionally the timestamp of its own transmission $S1(t_n')$.
9. C receives the Delay_Response message, and, if it has received $S_1(t_n')$ in 8., may record the message reception time $C_1(t_n')$.
10. C calculates its clock offset against S, as measured by the two-way method, as follows:

$$x_T(t_n) = \frac{(C_1(t_k) - S_1(t_k)) - (S_2(t_n) - C_2(t_n))}{2}$$

As an option, the newer measurement values $S_1(t_n')$ and $C_1(t_n')$ from 9 can be used in place or in combination with $S_1(t_k)$ and $C_1(t_k)$. The client also determines the quality of $xT(t_n)$ (e.g., by estimating the measurement variance $\sigma_T^2$).

11. C combines the two offset measurements $x_G$ and $x_T$ into the final offset estimate x(t), taking into account their estimated qualities. For example:

$$x(t) = x_G(t_i)\frac{\sigma_T^2}{\sigma_G^2 + \sigma_T^2} + x_T(t_n)\frac{\sigma_G^2}{\sigma_G^2 + \sigma_T^2}$$

The client can adjust its clock according to C(t)←C(t)−x(t). The final offset estimate can, for example, be formally derived as a maximum likelihood estimate from two independent Gaussian measurements $x_G$ and $x_T$ with variances $\sigma_G^2$ and $\sigma_T^2$. In a practically relevant case where the GPS-derived measurements xG are much more accurate than $x^T$, due to the network transmission delays and jitter of the latter, i.e. $\sigma_G^2 \ll \sigma_T^2$, this can result in x(t)=xG(ti). The present procedure can allow a seamless or hitless transition between the two offset measurement schemes, if one fails and hence its variance increases.

12. Update times $t_n$, $t_k$, and $t_i$, and loop cyclically from step 3. The update of time instances $t_i$ (when GPS time measurements and offset transfer are performed), the times $t_k$ (when the server broadcasts Sync messages) and time instances to (when the two-way measurement exchange is performed) need not be synchronous. The newest available smoothed measurements should be used in the update algorithms. The update rates of these procedures can be selected based on availability of resources such as processor time and network bandwidth. Higher rates increase accuracy of estimation, at a cost of higher processing and communication load.

In order to accurately measure and correct the time offset x(t) in an exemplary embodiment, the frequency offset y(t) of the clocks can be estimated using successive time offset measurements. A basic assumption is a linearly increasing clock offset, wherein quadratic models can also be envisaged.

The message transmission delays can be subject to stochastic jitter and outliers. The cyclic repetition of the described procedure allows the application of the known smoothing algorithms to improve accuracy. Also, the noise (jitter) variance can be estimated and other method to asses the measurement accuracies employed. For example, large values of the difference $|C_k(t_n)-S_k(t_n)|$ are outliers indicating isolated transmission problems affecting the transmission delays, and should not be used to update the desired clock offset estimates. Recursive estimation algorithms which can interpolate between missing samples, such as temporary loss of GPS reception or outliers in the network delays, can be applied to, for example, improve performance.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appeneed claims rather than the foregoing description and all changes that come within the meaning and range and equivalence thereof are intended to be embraced therein.

LIST OF DESIGNATIONS

1 Phasor Measurement Unit (PMU)
2 Network Control Center (NCC)
3 GPS satellite
4 Wide Area Communication Network

What is claimed is:

1. A method of estimating a time offset between first and second clocks which receive a global time signal and which are interconnected through a communication network, comprising:
   receiving a broadcast global time signal from a global time reference for calculating, at the first clock, a common view based clock offset between the first and second clocks based on reception times of the global time signal at each of the first and second clocks;
   exchanging time-critical messages between the first and second clocks;
   calculating, at the first clock, a network based clock offset between the first and second clocks based on transmission times and reception times of the messages exchanged; and
   combining the common view based clock offset and the network based clock offset to estimate the time offset.

2. The method according to claim 1, comprising:
   estimating qualities for the common view clock offset and the network based clock offset; and
   combining the common view clock offset and the network based clock offset by calculating a weighted average based on the estimated qualities.

3. The method according to claim 1, wherein the calculating of the common view based clock offset comprises:
   sending, by the second clock, a message containing a reception time of the global time signal at the second clock to the first clock in a non-time critical manner.

4. The method according to claim 1, comprising:
   updating independently and repeatedly a calculation of the common view based clock offset and the network based clock offset.

5. The method according to claim 1, wherein the first clock is a stationary clock of a phasor measurement unit (PMU) of a wide area monitoring system, and the second clock is a stationary clock at a network control center of the wide area monitoring system.

6. The method according to claim 5, wherein the calculating of the network based clock offset comprises:
   sending a time-critical message including PMU phasor data from the first clock to the second clock.

7. A device comprising:
   means for receiving a global time signal at a location of a first clock; and
   means for calculating a common view based clock offset between the first clock and a second clock based on reception times of the global time signal at each of the first clock and the second clock, and for calculating a network based clock offset between the first clock and the second clock based on transmission times and reception times of time-critical messages exchanged between the first clock and the second clock, wherein the calculating means combines the common view based clock offset and the network based clock offset to estimate a time offset between the first clock and the second clock.

8. The device according to claim 7, wherein the means for receiving exchanges messages with a communication network.

9. The device according to claim 8, in combination with:
   a communication network; and
   a second clock of a network control center.

* * * * *